United States Patent
Ganapathi et al.

(10) Patent No.: US 9,391,748 B2
(45) Date of Patent: Jul. 12, 2016

(54) METHOD AND SYSTEM OF ALLOCATING TIMESLOTS IN A MULTIPLE USERS REUSING ONE SLOT (MUROS) ENVIRONMENT

(75) Inventors: Sarvesha Anegundi Ganapathi, Bangalore (IN); Satish Nanjunda Swamy Jamadagni, Bangalore (IN); Jongsoo Choi, Middlesex (GB)

(73) Assignee: Samsung Electronics Co., Ltd (KR)

( * ) Notice: Subject to any disclaimer, the term of this patent is extended or adjusted under 35 U.S.C. 154(b) by 304 days.

(21) Appl. No.: 13/697,476

(22) PCT Filed: May 12, 2011

(86) PCT No.: PCT/KR2011/003526
§ 371 (c)(1),
(2), (4) Date: Nov. 12, 2012

(87) PCT Pub. No.: WO2011/142613
PCT Pub. Date: Nov. 17, 2011

(65) Prior Publication Data
US 2013/0058249 A1  Mar. 7, 2013

(30) Foreign Application Priority Data
May 12, 2010 (IN) .......................... 1336/CHE/2010

(51) Int. Cl.
H04L 12/28 (2006.01)
H04L 5/00 (2006.01)
H04W 72/04 (2009.01)
H04W 24/10 (2009.01)
H04W 72/08 (2009.01)

(52) U.S. Cl.
CPC ......... *H04L 5/0037* (2013.01); *H04W 72/0446* (2013.01); *H04W 24/10* (2013.01); *H04W 72/082* (2013.01)

(58) Field of Classification Search
None
See application file for complete search history.

(56) References Cited

U.S. PATENT DOCUMENTS

| 2002/0168944 A1 | 11/2002 | Terry et al. | |
| 2005/0186981 A1* | 8/2005 | Nishio | H04W 52/04 455/522 |

(Continued)

FOREIGN PATENT DOCUMENTS

| EP | 2 157 752 | 2/2010 |
| KR | 1020080053384 | 6/2008 |

(Continued)

OTHER PUBLICATIONS

Nokia Siemens Networks et al., "Voice Capacity Evolution with Orthogonal Sub Channels", 3GPP TSG GERAN # 36, Nov. 9, 2007.

(Continued)

*Primary Examiner* — Nicholas Sloms
(74) *Attorney, Agent, or Firm* — The Farrell Law Firm, P.C.

(57) ABSTRACT

A method and system are provided for allocating timeslots in a Multiple Users Reusing One Slot (MUROS) environment. A method includes receiving measurement data from a first mobile station over the uplink channel; evaluating a set of parameters associated with pairing the first mobile station in the uplink channel and the downlink channel, respectively, based on the measurement data; associating a first timeslot in a frame between the first mobile station and a set of mobile stations for uplink data transmission using the evaluated set of parameters; and associating a second timeslot in the frame between the first mobile station and a second set of mobile stations for downlink data transmission using the evaluated set of parameters.

14 Claims, 3 Drawing Sheets

(56) References Cited

U.S. PATENT DOCUMENTS

| | | | |
|---|---|---|---|
| 2009/0201880 A1* | 8/2009 | Aghili et al. | 370/331 |
| 2010/0067440 A1 | 3/2010 | Dick et al. | |
| 2011/0051650 A1* | 3/2011 | Winstok et al. | 370/312 |

FOREIGN PATENT DOCUMENTS

| | | |
|---|---|---|
| WO | WO 2009/036389 | 3/2009 |
| WO | WO 2009/123540 | 10/2009 |
| WO | WO2010030399 | 3/2010 |
| WO | WO 2010/036020 | 4/2010 |

OTHER PUBLICATIONS

PCT/ISA/237 Written Opinion issued on PCT/KR2011/003526 (pp. 3).

PCT/ISA/210 Search Report issued on PCT/KR2011/003526 (pp. 4).

* cited by examiner

METHOD AND SYSTEM OF ALLOCATING TIMESLOTS IN A MULTIPLE USERS REUSING ONE SLOT (MUROS) ENVIRONMENT

PRIORITY

This application claims priority under 35 U.S.C. §365(c) to International Application No. PCT/KR2011/003526 filed in the Korean Intellectual Property Office on May 12, 2011, and priority under 35 U.S.C. §119(a) to Patent Application No. 1336/CHE/2010 filed in the Indian Patent Office on May 12, 2010, the entire disclosure of each of which is incorporated herein by reference.

BACKGROUND OF THE INVENTION

1. Field of the Invention

The present invention relates generally to wireless communication, and more particularly, to allocating timeslots in a Multiple Users Reusing One Slot (MUROS) environment.

2. Description of the Related Art

With the recent advancement in digital mobile communication, various approaches have been developed to allow multiple communication devices to reuse a single timeslot in a frame, which is commonly referred to as Multiple Users Reusing One Slot (MUROS) technology.

For example, MUROS technology allows pairing of two or more communication devices (e.g., up to four) to use one timeslot to transmit or receive voice signals in Global System for Mobile communications (GSM), General Packet Radio Service (GPRS), and Enhanced Data rates for GSM Evolution (EDGE) wireless systems. Theoretically, MUROS technology enhances a cell capacity by pairing the two or more communication devices onto a single timeslot. That is, MUROS can at least double voice capacity of the wireless network without requiring additional transmit and receive radio resources.

Communication devices in a cell should be paired onto a single timeslot in such a way that link quality of any one of the paired communication devices does not see a drastic degradation. For example, if upon pairing, the link quality sees a sudden degradation, calls associated with the paired communication devices may get dropped. The link quality of the communication devices that are paired mainly depends on a Bit Error Rate (BER) and Signal to Noise Ratio (SNR) characteristics of the communication devices.

MUROS capable mobile terminals typically see different interference profiles in uplink and downlink. Consequently, the uplink and downlink pairing scenarios should be considered separately.

SUMMARY OF THE INVENTION

Accordingly, the present invention is designed to address at least the problems and/or disadvantages described above and to provide at least the advantages described below.

Accordingly, an aspect of the present invention is to provide a method and system for allocating timeslots in a MUROS environment.

In accordance with an aspect of the present invention, a method of a base station is provided for allocating timeslots in an uplink channel and a downlink channel in a Multiple Users Reusing One Slot (MUROS) environment. The method includes receiving measurement data from a first mobile station over the uplink channel; evaluating a set of parameters associated with pairing the first mobile station in the uplink channel and the downlink channel, respectively, based on the measurement data; associating a first timeslot in a frame between the first mobile station and a set of mobile stations for uplink data transmission using the evaluated set of parameters; and associating a second timeslot in the frame between the first mobile station and a second set of mobile stations for downlink data transmission using the evaluated set of parameters.

In accordance with another aspect of the present invention, an apparatus is provided for allocating timeslots in an uplink channel and a downlink channel in a Multiple Users Reusing One Slot (MUROS) environment. The apparatus includes a processor; and a memory that store instructions, which when executed by the processor, cause the processor to perform a method that includes receiving measurement data from a first mobile station over the uplink channel; evaluating a set of parameters associated with pairing the first mobile station in the uplink channel and the downlink channel, respectively, based on the measurement data; associating a first timeslot in a frame between the first mobile station and a set of mobile stations for uplink data transmission using the evaluated set of parameters; and associating a second timeslot in the frame between the first mobile station and a second set of mobile stations for downlink data transmission using the evaluated set of parameters.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method and system are provided for allocating timeslots in a MUROS environment.

Figure 1:
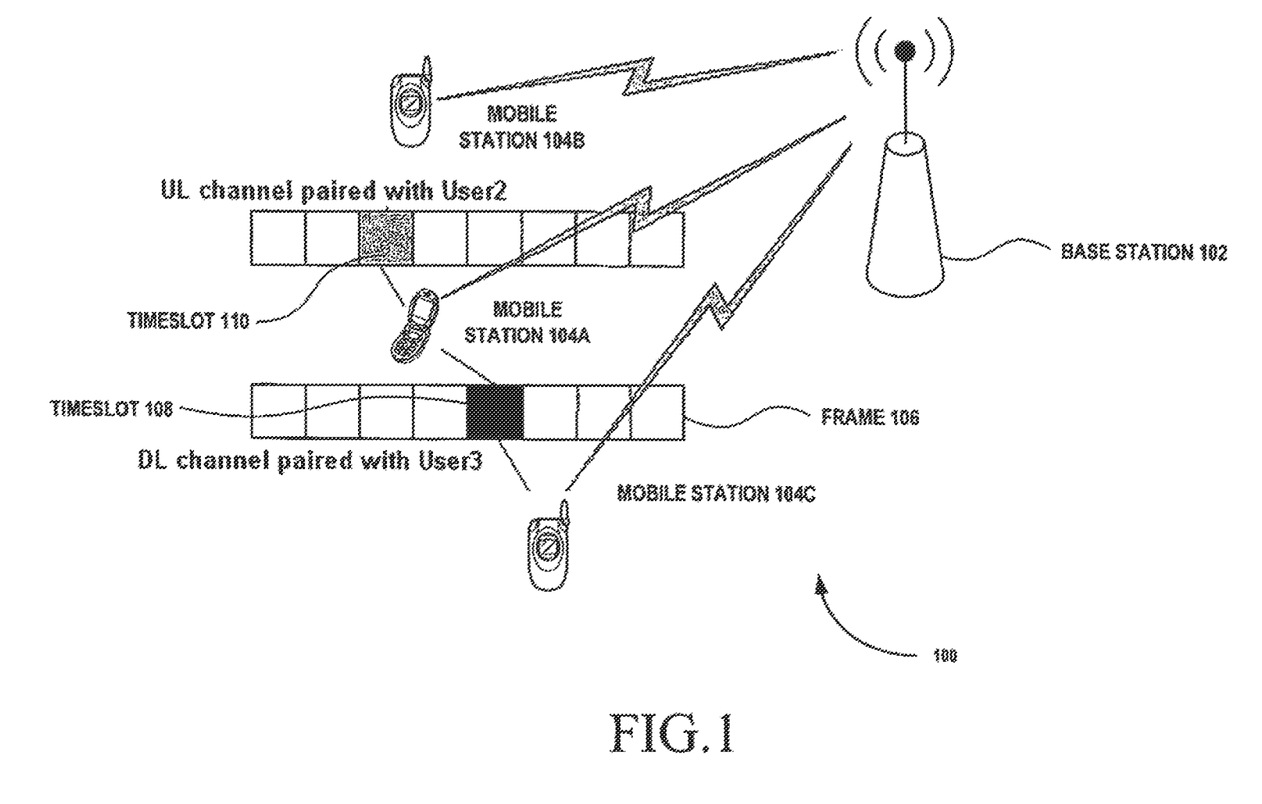
FIG. 1 is a block diagram illustrating a MUROS environment implementing independent pairing of uplink and downlink channels, according to an embodiment of the present invention.

FIG. 1 is a block diagram illustrating a MUROS environment implementing independent pairing of uplink and downlink channels, according to an embodiment of the present invention.

Referring to FIG. 1, the MUROS environment 100 includes a base station 102, and mobile stations 104A-N, which are connected to the base station 102.

The mobile station 104A is allocated a timeslot in frame 106. Accordingly, the base station 102 sends dummy data in the timeslot to the mobile station 104A over a downlink channel. The mobile station 104A, upon receiving the dummy data, monitors the timeslots available in the frame 106 and generates measurement report data. The mobile station 104A sends the dummy data and measurement report data to the base station 102 on the timeslot over an uplink channel. The base station 102 then evaluates downlink pairing criteria and uplink pairing criteria based on the measurement report data and the dummy data. Accordingly, the base station 102 associates a timeslot 108 with the mobile station 104A and the mobile station 104C for downlink data transmission based on downlink pairing criteria. Similarly, the base station 102 associates a timeslot 110 with the mobile station 104A and the mobile station 104B for uplink data transmission based on the uplink pairing criteria.

Figure 2:
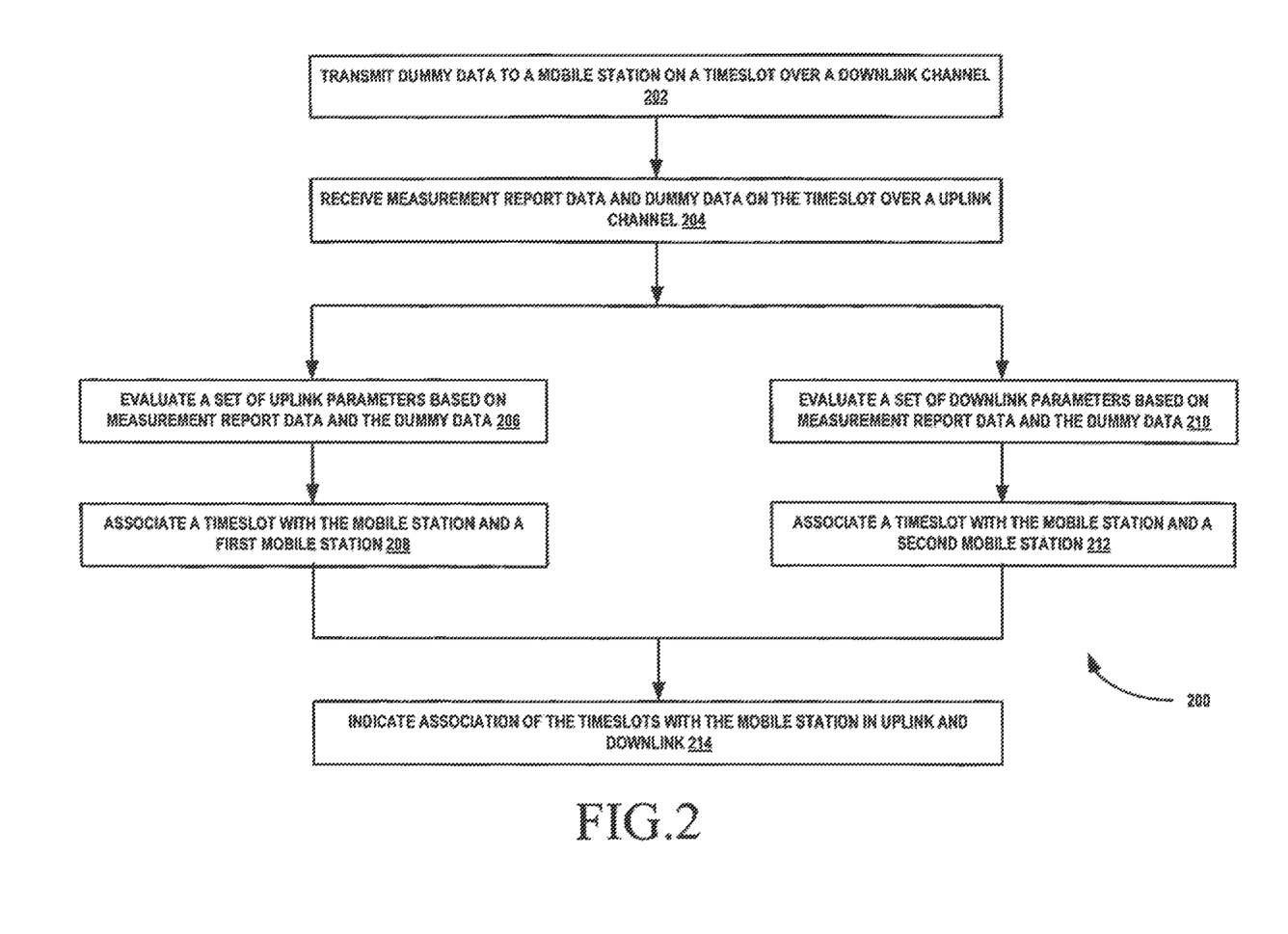
FIG. 2 is a flowchart illustrating a method of allocating timeslots in a MUROS environment, according to an embodiment of the present invention.

FIG. 2 is a flowchart illustrating a method of allocating timeslots in a MUROS environment, according to an embodiment of the present invention.

Referring to FIG. 2, in step 202, dummy data is transmitted to a mobile station (e.g., the mobile station 104A) on a timeslot of a frame over a downlink channel. Upon receiving the dummy data, the mobile station 104A monitors one or more timeslots of the frame 106 and generates a measurement report including measurement report data based on monitoring of the timeslots.

In step 204, the measurement report data and the dummy data is received from the mobile station 104A over an uplink channel. In step 206, a set of uplink parameters associated with pairing the uplink channel is evaluated, based on the measurement report data and the dummy data. For example, the uplink parameters (also referred as uplink pairing criteria) may include a timing advance, an SNR, a Forward Error Rate (FER), a BLock Error Rate (BLER), a rank of wireless channel matrix, a condition number, etc.

In step 208, a timeslot 110 in the frame 106 is associated with the mobile station 104A and the mobile station 104B for uplink data transmission over the uplink channel. For example, the timeslot may be the same or different timeslot on which the dummy data is received in the uplink.

In step 210, a set of downlink parameters associated with pairing the downlink channel is evaluated, based on the measurement report data and the dummy data. For example, downlink parameters (also referred as downlink pairing criteria) may include a timing advance, an SNR, an FER, a BLER, etc.

In step 212, a timeslot 108 in the frame 106 is associated with the mobile station 104A and the mobile station 104C for downlink data transmission over the downlink channel.

Herein, the timeslot in the uplink and the downlink can be the same or different and is selected based on ability of the base station 102 and the mobile station 104A to successfully decode uplink data and downlink data. More importantly, the base station 102 determines a timeslot to be allocated for uplink data transmission on the uplink channel, based on its ability to decode the dummy data received from the mobile station 104A and the measurement report data.

In the downlink, an individual user's decoding performance depends largely on a Sub Channel Power Imbalance Ratio (SCPIR) that is used (e.g., which may depend on a type of user). If an incorrect SCPIR is used, interference to either of the mobile stations from the other paired mobile stations significantly increases, thereby degrading performance.

Further, it is advisable to consider mobile stations with sufficiently high SNR (at least for a subset of users considered for pairing) so that FER after pairing does not increase beyond a threshold, resulting in eventual call drops.

In the uplink, paired mobile stations antennas and multiple antennas at the base station 102 form a spatial multiplexing Multiple Input Multiple Output (MIMO) system. A scenario in which two users are considered for pairing is shown below in Equation (1).

$$\begin{bmatrix} y1 \\ y2 \end{bmatrix} = \begin{bmatrix} h11 & h12 \\ h21 & h22 \end{bmatrix} \cdot \begin{bmatrix} x1 \\ x2 \end{bmatrix} \quad (1)$$

In Equation (1), yi indicates a received symbol at a receiving antenna i at the base station 102, hij indicates a wireless channel between the ith receiving antenna at the base station 102 and a jth user, and xj indicates a transmitted symbol from the jth user.

The performance of such a system depends on the capability of separating and decoding the individual user's streams. This depends on 'Rank' and 'Condition number' of a complex matrix formed by wireless channels ([hij]) between the set of transmitting and receiving antennas along with the SNRs seen.

The performance at the base station 102 may improve when users are paired such that the condition number is close to 1, or does not deviate too far from 1. This parameter largely depends on the proximity of the users and the angular separation between the transmitting signals.

As the governing parameters that affect performance are different in a downlink and an uplink, the uplink and the downlink parameters are separately evaluated at the base station 102.

In step 214, the timeslots allocated for the uplink data transmission and the downlink data transmission are indicated to the mobile station 104A, such that the mobile station 104A sends and receives the uplink and downlink data on the allocated timeslots 108 and 110. Also, an associated frequency hopping sequence for uplink and downlink, respectively, is indicated to the mobile station 104A. For example, the timeslots may be indicated through an enhanced resource allocation message, a channel configuration message, or a handover command message.

Table 1 below shows an example of an assignment command message indicating allocation of a timeslot.

TABLE 1

| IEI | Information element | Type/Reference | Presence | Format | Length |
|---|---|---|---|---|---|
| | RR managementProtocol Discriminator | Protocol Discriminator10.2 | M | V | ½ |
| | Skip Indicator | Skip Indicator10.3.1 | M | V | ½ |
| | Assignment commandMessage Type | Message Type10.4 | M | V | 1 |
| | Description of the First Channel, after time | Channel Description 210.5.2.5a | M | V | 3 |

TABLE 1-continued

| IEI | Information element | Type/Reference | Presence | Format | Length |
|---|---|---|---|---|---|
|  | Power Command | Power Command10.5.2.28 | M | V | 1 |
| 05 | Frequency List, after time | Frequency List10.5.2.13 | C | TLV | 4-132 |
| 62 | Cell Channel Description | Cell Channel Description10.5.2.1b | O | TV | 17 |
| 10 | Description of the multislot configuration | Multislot Allocation10.5.2.21b | C | TLV | 3-12 |
| 63 | Mode of the First Channel (Channel Set 1) | Channel Mode10.5.2.6 | O | TV | 2 |
| 11 | Mode of Channel Set 2 | Channel Mode10.5.2.6 | O | TV | 2 |
| 13 | Mode of Channel Set 3 | Channel Mode10.5.2.6 | O | TV | 2 |
| 14 | Mode of Channel Set 4 | Channel Mode10.5.2.6 | O | TV | 2 |
| 15 | Mode of Channel Set 5 | Channel Mode10.5.2.6 | O | TV | 2 |
| 16 | Mode of Channel Set 6 | Channel Mode10.5.2.6 | O | TV | 2 |
| 17 | Mode of Channel Set 7 | Channel Mode10.5.2.6 | O | TV | 2 |
| 18 | Mode of Channel Set 8 | Channel Mode10.5.2.6 | O | TV | 2 |
| 64 | Description of the Second Channel, after time | Channel Description10.5.2.5 | O | TV | 4 |
| 66 | Mode of the Second Channel | Channel Mode 210.5.2.7 | O | TV | 2 |
| 72 | Mobile Allocation, after time | Mobile Allocation10.5.2.21 | C | TLV | 3-10 |
| 7C | Starting Time | Starting Time10.5.2.38 | O | TV | 3 |
| 19 | Frequency List, before time | Frequency List10.5.2.13 | C | TLV | 4-132 |
| 1C | Description of the First Channel, before time | Channel Description 210.5.2.5a | O | TV | 4 |
| 1D | Description of the Second Channel, before time | Channel Description10.5.2.5 | O | TV | 4 |
| 1E | Frequency channel sequence before time | Frequency channel sequence10.5.2.12 | C | TV | 10 |
| 21 | Mobile Allocation, before time | Mobile Allocation10.5.2.21 | C | TLV | 3-10 |
| 9- | Cipher Mode Setting | Cipher Mode Setting10.5.2.9 | O | TV | 1 |
| 01 | VGCS target mode Indication | VGCS target mode Indication10.5.2.42a | O | TLV | 3 |
| 03 | Multi-Rate configuration | MultiRate configuration10.5.2.21aa | O | TLV | 4-8 |
| 04 | VGCS Ciphering Parameters | VGCS Ciphering Parameters10.5.2.42b | O | TLV | 3-15 |
|  | Description of the UL paired Channel, after time | Paired UL Channel Description xx | M | V | 3 |
|  | Description of the DL paired Channel, after time | Paired DL Channel Description xx | M | V | 3 |

In Table 1, IEI represents an "Information Element Index". Further, in the Presence column, M represents Mandatory, C represents Conditional, and O represents Optional. In the Format column, V represents Value Only, TV represents Type and Value, and TLV represents Type, Length and Value.

Further, examples of channel description information elements are shown below in Tables 2 and 3.

TABLE 2

Channel type and Time Division Multiple Access (TDMA) offset (octet 2)

| Bits | | | | | |
|---|---|---|---|---|---|
| 8 | 7 | 6 | 5 | 4 | |
| 0 | 0 | 0 | 0 | 0 | TCH/F (Traffic CHannel/Full rate) + FACCH/F (Fast, TCH/F Associated Control CHannel) and SACCH/M (Slow, TCH/F, O-TCH/F or E-TCH/F Associated Control CHannel for Multislot configurations) at the timeslot indicated by a Timeslot Number (TN), and additional bidirectional or unidirectional TCH/Fs and SACCH/Ms according to the multislot allocation information element |
| 0 | 0 | 0 | 0 | 1 | TCH/F + FACCH/F and SACCH/F |
| 0 | 0 | 0 | 1 | T | TCH/H (TCH/Half rate) + ACCHs (Associated Control CHannels) |
| 0 | 0 | 1 | T | T | SDCCH/4 (Stand alone Dedicated Control CHannel) + SACCH/C4 (Slow SDCCH/4 Associated Control CHannel) or CBCH (Cell Broadcast CHannel) (SDCCH/4) |
| 0 | 1 | T | T | T | SDCCH/8 + SACCH/C8 or CBCH (SDCCH/8) |
| 1 | 1 | 0 | 0 | 0 | TCH/F + ACCHs using Training Sequence Code (TSC) Set 2 |
| 1 | 1 | 1 | 0 | T | TCH/H + ACCHs using TSC Set 2 |

The T bits indicate the subchannel number coded in binary.

TABLE 2-continued

Channel type and Time Division Multiple Access (TDMA) offset (octet 2)

| Bits | | | | | |
|---|---|---|---|---|---|
| 8 | 7 | 6 | 5 | 4 | |

In the description below "n" is the timeslot number indicated by TN.
The description is valid only if all the indicated timeslot numbers are in the range 0 to 7.

| 1 | 0 | X | X | X | TCH/F + FACCH/F and SACCH/M at the time slot indicated by TN, and additional bidirectional TCH/Fs and SACCH/Ms at other timeslots according to the following: |

X X X:
0 0 0 no additional timeslots
0 0 1 at timeslot n − 1
0 1 0 at timeslot n + 1, n − 1
0 1 1 at timeslot n + 1, n − 1 and n − 2
1 0 0 at timeslot n + 1, n − 1, n − 2, and n − 3
1 0 1 at timeslot n + 1, n − 1, n − 2, n − 3 and n − 4
1 1 0 at timeslot n + 1, n − 1, n − 2, n − 3, n − 4 and n − 5
1 1 1 at timeslot n + 1, n − 1, n − 2, n − 3, n − 4, n − 5 and n − 6

| 1 1 0 0 1 | TCH/F + FACCH/F and SACCH/M at the time slot indicated by TN and |
| to | additional unidirectional TCH/FDs (the downlink part of the corresponding TCH/F) and |
| 1 1 0 1 1 | SACCH/MDs (The downlink part of SACCH/M) at other timeslots according to the following: |

1 1 0 0 1 at timeslot n − 1
1 1 0 1 0 at timeslot n + 1, n − 1
1 1 0 1 1 at timeslot n + 1, n − 1 and n − 2

| 1 1 1 1 0 | TCH/F + FACCH/F and SACCH/M at the time slot indicated by TN and additional bidirectional TCH/F and SACCH/M at timeslot n + 1 and unidirectional TCH/FD and SACCH/MD at timeslot n − 1 |
| | All other values are reserved. |

TABLE 3

TN, Timeslot Number (octet 2)
The TN field is coded as the binary representation of the timeslot number as defined in
3$^{RD}$ Generation Partnership Project (3GPP) Technical Standard (TS) 3GPP TS
45.010.
Range: 0 to 7.
TSC, Training Sequence Code (octet 3)
The TSC field is coded as the binary representation of the Training Sequence code as
defined in 3GPP TS 45.002
Unless stated otherwise by coding of 'Channel type and TDMA offset'
IE, TSC Set 1 shall be used.
Range: 0 to 7.
H, Hopping channel (octet 3)
Bit
5
0 Single a Radio Frequency (RF) channel
1 RF hopping channel
NOTE: The value of H affects the semantics of the channel selector field *
Channel selector (octet 3 and 4)
H = "0": The channel selector field consists of the absolute RF channel number
Octet 3
Bits
4 3
0 0 Spare
Absolute Radio-Frequency Channel Number (ARFCN), (octet 3, bits 2 and 1, and octet
4, bits 8 to 1)
The ARFCN is coded as the binary representation of the absolute RF channel number
Range: 0 to 1023
H = "1": The channel selector field consists of a Mobile Allocation Index Offset
(MAIO), and the Hopping Sequence Number (HSN).
MAIO, (octet 3 bit 4 to 1 high part and octet 4 bit 8 to 7 low part)
The MAIO field is coded as the binary representation of the mobile allocation index
offset as defined in 3GPP TS 45.002.
Range: 0 to 63.
HSN, (octet 4 bit 6 to 1)
The HSN field is coded as the binary representation of the hopping sequence number as
defined in 3GPP TS 45.002
Range 0 to 63.

The base station can assign the same timeslot in the downlink as well as in the uplink for the new mobile station, based on the combined evaluation of downlink and uplink parameters so that it can be paired with the best possible incumbent mobile station.

Figure 3:
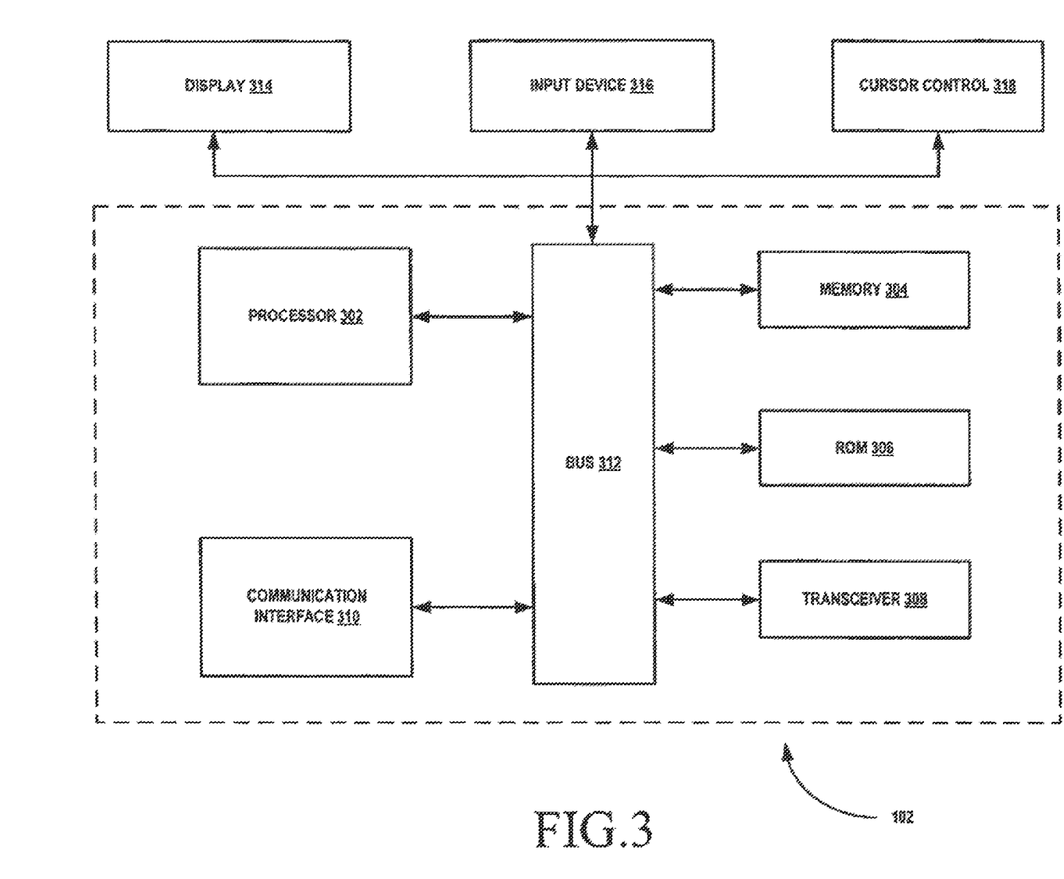
FIG. 3 is a block diagram illustrating a base station according to an embodiment of the present invention.

FIG. 3 is a block diagram illustrating a base station according to an embodiment of the present invention.

Referring to FIG. 3, the base station 102 includes a processor 302, a memory 304, a Read Only Memory (ROM) 306, a transceiver 308, a bus 312, a communication interface 310, a display 314, an input device 316, and a cursor control 318.

The processor 302 may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 302 may also include embedded controllers, such as generic or programmable logic devices or arrays, application specific integrated circuits, single-chip computers, smart cards, etc.

The memory 304 and the ROM 306 may be volatile memory and non-volatile memory. The memory 304 includes instructions temporarily stored therein to allocate timeslots to a mobile station separately in uplink channel and downlink channel, according to the embodiments of the present subject matter. A variety of computer-readable storage media may be stored in and accessed from the memory elements. Memory elements may include any suitable memory device(s) for storing data and machine-readable instructions, such as a ROM, Random Access Memory (RAM), an Erasable Programmable ROM (EPROM), an Electrically EPROM (EEPROM), a hard drive, a removable media drive for handling memory cards, Memory Sticks™, etc.

Additionally, the embodiments of the present invention described herein may also be implemented in conjunction with modules, including functions, procedures, data structures, and application programs, for performing tasks, or defining abstract data types or low-level hardware contexts. Machine-readable instructions stored on any of the above-mentioned storage media may be executable by the processor 302. For example, a computer program may include machine-readable instructions capable of allocating timeslots to a mobile station in uplink channel and downlink channel separately, according to the teachings and herein described embodiments of the present invention.

In accordance with an embodiment of the present invention, a program may be included on a storage medium and loaded from the storage medium to a hard drive in the non-volatile memory. The machine-readable instructions may cause the base station 102 to encode according to any of the above-described embodiments of the present invention.

The bus 312 acts as interconnect between various components of the base station 102.

The components such as the transceiver 308, the communication interfaces 310, the display 314, the input device 316, and the cursor control 318 are well known to the person skilled in the art, and hence, a detailed explanation is thereof omitted.

The various devices, modules, selectors, estimators, and the like described herein may be enabled and operated using hardware circuitry, for example, complementary metal oxide semiconductor based logic circuitry, firmware, and/or any combination of hardware, firmware, and/or software embodied in a machine readable medium. For example, the various electrical structure and methods may be embodied using transistors, logic gates, and electrical circuits, such as application specific integrated circuit.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

The invention claimed is:

1. A method of a base station for allocating timeslots in an uplink channel and a downlink channel in a multiple users reusing one slot environment, the method comprising:
receiving measurement data and dummy data from a first mobile station over the uplink channel;
determining a set of parameters associated with pairing the first mobile station in the uplink channel and the downlink channel, respectively, based on the measurement data and the dummy data;
associating a first timeslot in a frame between the first mobile station and a set of mobile stations for uplink data transmission using the determined set of parameters; and
associating a second timeslot, which is different from the first time slot, in the frame between the first mobile station and a second set of mobile stations for downlink data transmission using the determined set of parameters.

2. The method of claim 1, wherein the set of parameters includes a set of downlink parameters and a set of uplink parameters.

3. The method of claim 2, wherein the set of downlink parameters includes at least one of a timing advance, a Signal-to-Noise Ratio (SNR), a Forward Error Rate (FER), and a BLock Error Rate (BLER).

4. The method of claim 2, wherein the set of uplink parameters includes at least one of a timing advance, an SNR, an FER, a BLER, a rank of a wireless channel matrix, and a condition number.

5. The method of claim 1, further comprising indicating an association of the first time slot for the uplink data transmission and the second timeslot for the downlink data transmission to the first mobile station.

6. The method of claim 1, further comprising indicating a frequency hopping sequence associated with the uplink data transmission and the downlink data transmission, respectively.

7. The method of claim 1, wherein receiving the measurement data from the first mobile station comprises:
sending the dummy data to the first mobile station on a particular timeslot of the frame over the downlink channel; and
receiving the measurement data and the dummy data from the first mobile station on the particular timeslot of the frame over the uplink channel.

8. An apparatus for allocating timeslots in an uplink channel and a downlink channel in a multiple users reusing one slot environment, the apparatus comprising:
a processor; and
a memory that store instructions, which when executed by the processor, cause the processor to perform a method comprising:
receiving measurement data and dummy data from a first mobile station over the uplink channel;

determining a set of parameters associated with pairing the first mobile station in the uplink channel and the downlink channel, respectively, based on the measurement data and the dummy data;

associating a first timeslot in a frame between the first mobile station and a set of mobile stations for uplink data transmission using the determined set of parameters; and associating a second timeslot, which is different from the first time slot, in the frame between the first mobile station and a second set of mobile stations for downlink data transmission using the determined set of parameters.

9. The apparatus of claim 8, wherein the set of parameters comprises a set of downlink parameters and a set of uplink parameters.

10. The apparatus of claim 9, wherein the set of downlink parameters comprises at least one of a timing advance, a Signal-to-Noise Ratio (SNR), a Forward Error Rate (FER), and a BLock Error Rate (BLER).

11. The apparatus of claim 9, wherein the set of uplink parameters comprises at least one of a timing advance, an SNR, an FER, a BLER, a rank of a wireless channel matrix, and a condition number.

12. The apparatus of claim 8, wherein the method further comprises indicating an association of the first time slot for the uplink data transmission and the second timeslot for the downlink data transmission to the first mobile station.

13. The apparatus of claim 8, wherein the method further comprises indicating a frequency hopping sequence associated with the uplink data transmission and the downlink data transmission respectively.

14. The apparatus of claim 8, wherein receiving the measurement data from the first mobile station comprises:

sending the dummy data to the first mobile station on a particular timeslot of the frame over the downlink channel; and receiving the measurement data and the dummy data from the first mobile station on the particular timeslot of the frame over the uplink channel.

\* \* \* \* \*